United States Patent
Norton et al.

(10) Patent No.: US 7,892,587 B2
(45) Date of Patent: Feb. 22, 2011

(54) COFFEE WITH ENHANCED FLAVOR PROVIDED BY 3,7-DIMETHYLOCTA-1,6-DIEN-3-OL

(75) Inventors: Mark Richard Thomas Norton, Banbury (GB); Jeremy John Stagg, Banbury (GB)

(73) Assignee: Kraft Foods Global Brands LLC, Northfield, IL (US)

( * ) Notice: Subject to any disclaimer, the term of this patent is extended or adjusted under 35 U.S.C. 154(b) by 1152 days.

(21) Appl. No.: 10/562,394

(22) PCT Filed: Jun. 25, 2004

(86) PCT No.: PCT/US2004/020241
§ 371 (c)(1),
(2), (4) Date: May 16, 2006

(87) PCT Pub. No.: WO2005/000031
PCT Pub. Date: Jan. 6, 2005

(65) Prior Publication Data
US 2007/0042097 A1    Feb. 22, 2007

Related U.S. Application Data

(60) Provisional application No. 60/482,008, filed on Jun. 25, 2003.

(51) Int. Cl.
*A23L 2/56*    (2006.01)
*A23F 5/10*    (2006.01)
(52) U.S. Cl. .................. 426/534; 426/590; 426/594; 426/595
(58) Field of Classification Search .................. None
See application file for complete search history.

(56) References Cited

U.S. PATENT DOCUMENTS

| 4,041,185 | A |   | 8/1977  | Parliment |
| 4,311,720 | A | * | 1/1982  | Marmo et al. ............... 426/594 |
| 4,590,085 | A | * | 5/1986  | Sidoti et al. ................ 426/582 |
| 4,698,264 | A | * | 10/1987 | Steinke .................... 428/402.2 |
| 4,867,992 | A | * | 9/1989  | Boniello et al. .............. 426/45 |
| 6,299,926 | B1 | * | 10/2001 | Balakrishnan et al. ...... 426/597 |
| 6,565,710 | B2 |   | 5/2003  | Salow et al. |

OTHER PUBLICATIONS

Blank et al. "Aroma Impact Compounds of Arabica and Robusta Coffee. Qualitative and Quantitative Investigations" ASIC 14e Colloque 1991.*
Sivetz "Coffee Technology" AVI Publishing Company 1983 p. 496.*
Shankaracharya, N. B. et al., "Cardamom-chemistry, technology and uses," *Indian Food Packer*, vol. 25, No. 5, 1971, pp. 28-36.
Schenker, S. et al., "Impact of roasting conditions on the formation of aroma compounds in coffee beans," *Journal of Food Science*, vol. 67, No. 1, 2002, pp. 60-66.
Blank et al; "Potent odorants of the roasted powder and brew of Arabica coffee"; 1992; pp. 239-245; vol. 195; Germany.
Holscher et al; "Aroma Compounds in Green Coffee"; 1995; pp. 785-803; Food Flavors: Generation, Analysis and Process Influence; USA.
"Effect of Water Quality on Coffee Brewing" Chapter 8; pp. 193-206.

* cited by examiner

*Primary Examiner*—Timothy M Speer
*Assistant Examiner*—Felicia C King
(74) *Attorney, Agent, or Firm*—Stites & Harbison PLLC; Marvin Petry; Stephen J. Weyer

(57) ABSTRACT

A coffee product and process are provided which produce a coffee product having elevated levels of 3,7-dimetylocta-1,6-dien-3-ol. In various forms, the coffee product is dry roast and ground coffee or a dry soluble coffee product such as a powder or granule form. The process includes adding 3,7-dimethylocta-1,6-dien-3-ol to roast and ground coffee or a soluble coffee to produce an enhanced coffee flavor beverage, or to an extract or solution thereof.

7 Claims, No Drawings

COFFEE WITH ENHANCED FLAVOR PROVIDED BY 3,7-DIMETHYLOCTA-1,6-DIEN-3-OL

CROSS REFERENCE TO RELATED APPLICATIONS

This application claims benefit of U.S. Provisional Application No. 60/482,008, filed Jun. 25, 2003.

FIELD OF THE INVENTION

The present invention relates to a coffee product that achieves high consumer taste satisfaction through an enhanced coffee related sensory attribute, and in particular to coffee which has an enhanced sensory attribute provided from elevated levels of 3,7-dimethylocta-1,6-dien-3-ol.

BACKGROUND OF THE INVENTION

Coffee beverages have been prepared as a roast and ground product since at least the 13$^{th}$ century. Coffee manufacturers attempt to control the sensorial impact of coffee to produce different or better products, which are then marketed to attract consumers who would be interested in that specific product. Typically, the basic roasting conditions of roast time and temperature are used to influence the well-known coffee characteristics. In general, coffee beans roasted at lower temperatures for a shorter period of time result in a lighter, more aromatic coffee, while coffee beans subjected to a combination of higher temperatures and a longer roasting time tend to be darker and stronger. The final taste and aroma of coffee is dependent also on the blend of green coffee origins. Most dramatic is the contrast between strong Robusta and complex, clean Arabica. In addition, there are more subtle differences within each coffee genus.

Conventionally, one describes the finished coffee product in terms of the degree of roast and the blend of coffee bean origins, since these are widely accepted as the primary drivers of consumer liking, i.e., taste preference. An illustration of this is the labeling of coffee products as light, medium or dark and possibly an indication of the origin of the coffee beans on their respective packaging. Through this information, the consumer makes a choice of the coffee that best suits his or her taste preference. Some consumers will prefer a low degree of roast while others will prefer a much darker roast product.

The principal consumer sensory characteristics of coffee are its roast quality and acidity as determined by consumer sensory evaluations of numerous diverse coffee types. An extensive independent study was conducted and published in an article by the European Sensory Network Food Research Association entitled, "A European Sensory and Consumer Study—A Case Study On Coffee" by J. A. McEwan. In this study, other attributes were described which play a minor role in characterizing the coffee flavor.

A widely accepted common coffee nomenclature has been developed over the history of coffee tasting to describe various flavor attributes of coffee. This common coffee nomenclature is used by experts for consistent coffee description and for the contrasting of individual coffees. For example, coffees may be described as grassy, green, citrus, floral, fruity, cereal, roasted, caramel, bitter, woody and winey, as well as other attributes.

In recent years, coffee manufactures have added additional flavors to coffee products. The additional flavors allow a certain amount of innovation within a coffee category that is traditionally restricted to its ingredients and processing, e.g. roasting conditions.

There are many instances where specialty or gourmet coffees have been produced through the addition of additional flavors to the coffee product to produce what is referred to as "flavored coffee". For example, the addition of hazelnut flavor to coffee results in a distinctly hazelnut flavored coffee. Such flavored coffees are positioned as coffee with a non-coffee flavor, and have become popular with consumers looking for a product displaying extra flavor attributes not intrinsic to coffee itself. Typical flavors that have been added to coffee include hazelnut, chocolate, vanilla, raspberry, Irish cream, toffee, orange, amaretto and marshmallow. Each flavor adds its own characteristic additional non-coffee attribute to the coffee product.

Coffee itself is a complex product which includes many compounds. Of these flavor compounds, only a few have been previously considered relevant to the taste and aroma of the final coffee beverage. Of the previously considered relevant compounds, they can be classified into groups by the flavor attribute with which they are associated when present within coffee beverages. An example of a flavor group is roasted-nutty. Coffee manufacturers change the flavor of coffee by varying the blend and roast conditions. As a consequence, the levels of coffee flavor compounds vary from product to product.

When processing coffee beans with the intent of positively affecting the intensity of one flavor attribute, commonly, there is a negative affect on at least one other flavor attribute. This can be linked to the chemistry of the coffee flavor compounds, which undergo different chemical reactions depending on the roast conditions.

One naturally occurring component in brewed coffee component is 3,7-dimethylocta-1,6-dien-3-ol. 3,7-dimethylocta-1,6-dien-3-ol is described as having a fruity floral character. Previously 3,7-dimethylocta-1,6-dien-3-ol was not believed to be of any "major" importance to coffee flavor and/or consumer liking. See, e.g. Blank-I; Sen-A; Grosch-W, "Potent odorants of the roasted powder and brew of Arabica coffee" *Zeitschrift-fuer-Lebensmittel-Untersuchung-und-Forschung;* 195 (3) 239-245, 1992 who assess 3,7-dimethylocta-1,6-dien-3-ol as being unimportant in the overall contribution to roasted coffee flavor.

Typically, 3,7-dimethylocta-1,6-dien-3-ol is present in roast and ground coffee product in an amount of between 30 µgkg$^{-1}$ and 4700 µgkg$^{-1}$, and in brewed coffee, 3,7-dimethylocta-1,6-dien-3-ol is present in an amount of 1 µgl$^{-1}$ and about 30 µgl$^{-1}$ (when brewed in a drip filter using 50 g roast and ground coffee and 1 liter of water). It should be noted that the amount of 3,7-dimethylocta-1,6-dien-3-ol in roast and ground coffee depends on the type of coffee bean used and its roasting conditions and the amount in brewed coffee also depends on the brewing conditions. Since a fruity floral character was not deemed desirable in a traditional coffee flavored beverage, additional 3,7-dimethylocta-1,6-dien-3-ol was not added to the natural occurring 3,7-dimethylocta-1,6-dien-3-ol levels in coffee.

Further, often, when varying one specific flavor attribute with the intention of optimizing the coffee product for one specific target group of consumers having a particular taste preference, the result is to affect another flavor attribute negatively with regard to taste preferences of that target group. In this way, certain flavors are said to be "coupled", and achieving certain levels of desirable attributes frequently requires compromising on undesirable attributes. For example, a coffee roasted under relatively extreme conditions produces desirable strong, dark, roasted flavors, but usually at the cost of introducing an undesirable level of bitterness. The coupled behavior hampers the extent to which a coffee can be made more acceptable to consumers. Accordingly, roast coffee flavors have long since been considered already optimized for consumer liking. Consequently, only minimal gains have been made recently.

What is needed in the art is a coffee which has enhanced natural coffee flavor appealing to a consumer's taste without introducing undesirable flavors.

SUMMARY OF THE INVENTION

The present invention relates to a coffee product that achieves high consumer taste satisfaction through an enhanced coffee related sensory attribute provided by elevated levels of 3,7-dimethylocta-1,6-dien-3-ol. Specifically, at particular elevated levels of additional 3,7-dimethylocta-1,6-dien-3-ol, consumer liking of coffee is enhanced over coffee without elevated levels of 3,7-dimethylocta-1,6-dien-3-ol.

The present invention, in one form thereof, relates to roast and ground coffee having levels of 3,7-dimethylocta-1,6-dien-3-ol of at least 6000 $\mu gkg^{-1}$ of dry roast and ground coffee as measured in the roast and ground product using the measurement method of Likens; Nickerson; *Pro Am. Soc. Brew. Chem.*, 5, 5-13 (1964) (hereinafter "the Likens method"). In one preferred form, the levels of 3,7-dimethylocta-1,6-dien-3-ol in dry roast and ground coffee is at least 8000 $\mu gkg^{-1}$ as measured using the Likens method. In another preferred form, the levels of 3,7-dimethylocta-1,6-dien-3-ol in dry roast and ground coffee is at least 16,000 $\mu gkg^{-1}$ as measured using the Likens method.

The invention in another form thereof relates to a method for manufacturing a coffee flavored beverage having enhanced in cup brew flavor which includes adding 3,7-dimethylocta-1,6-dien-3-ol to a dry roast and ground coffee to produce a final coffee product having at least a 25% higher level 3,7-dimethylocta-1,6-dien-3-ol than the natural level of 3,7-dimethylocta-1,6-dien-3-ol in the dry roast coffee as measured using the Likens method. In a preferred form, the final coffee product has levels of 3,7-dimethylocta-1,6-dien-3-ol which is at least 50% higher than the natural level of 3,7-dimethylocta-1,6-dien-3-ol in the dry roast coffee as measured using the Likens method. In yet another preferred form, the final coffee product has levels of 3,7-dimethylocta-1,6-dien-3-ol which is at least 100% higher than the natural level of 3,7-dimethylocta-1,6-dien-3-ol in the dry roast coffee as measured using the Likens method.

The present invention also relates to a soluble coffee product having levels of 3,7-dimethylocta-1,6-dien-3-ol of at least 2000 $\mu gkg^{-1}$ of soluble coffee solids present in the soluble coffee product as measured using the Likens method. In one preferable form, the amount of 3,7-dimethylocta-1,6-dien-3-ol is at least 4000 $\mu gkg^{-1}$ of soluble coffee solids using the Likens method. In yet another preferred form, the amount of 3,7-dimethylocta-1,6-dien-3-ol is at least 10,000 $\mu gkg^{-1}$ of soluble coffee solids as measured in soluble coffee product using the Likens method. Soluble coffee solids includes concentrated soluble solids of coffee such as spray dried, freeze dried, agglomerated and liquid concentrates, and coffee extract, to name a few.

In one further additional embodiment, 3,7-dimethylocta-1,6-dien-3-ol is encapsulated at higher or lower percentages in the matrix, and the percentage of encapsulated 3,7-dimethylocta-1,6-dien-3-ol that is incorporated into the roast and ground coffee is varied as necessary to achieve the desired coffee product.

The invention in another form thereof, relates to a roast whole bean coffee with a 3,7-dimethylocta-1,6-dien-3-ol coating. The coating can be applied to the whole bean by straying the whole bean with 3,7-dimethylocta-1,6-dien-3-ol dissolved in an appropriate oil base or organic carrier.

Advantageously, the 3,7-dimethylocta-1,6-dien-3-ol can be added to the roast and ground coffee product in an encapsulated form. For example, the encapsulated 3,7-dimethylocta-1,6-dien-3-ol-containing matrix may consist of the following components: maltodextrin (80%-99.98%), gum arabic (0%-19.98%), tricalcium phosphate (0%-1%) and 3,7-dimethylocta-1,6-dien-3-ol (0.02%-20%). The encapsulated 3,7-dimethylocta-1,6-dien-3-ol is then mixed into the roast and ground coffee at between 1% and 15% of the total final product weight.

The encapsulated 3,7-dimethylocta-1,6-dien-3-ol can be prepared by any technology that traps the coffee compound in a solid or glassy matrix until it is contacted by water in the brewing process. Suitable encapsulation methods include, but are not limited to, spray drying and freeze drying.

The present invention in another form thereof relates to a ready to drink coffee extract or ready to drink coffee extract mix with levels of 3,7-dimethylocta-1,6-dien-3-ol level of at least 2000 $\mu gkg^{-1}$ of coffee solids as measured using the Likens method. In one preferable form, the level of 3,7-dimethylocta-1,6-dien-3-ol is present in an amount of at least 4000 $\mu gkg^{-1}$ of coffee solids as measured in soluble coffee using the Likens method. In yet another preferred form, the level of 3,7-dimethylocta-1,6-dien-3-ol is present in an amount of at least 10,000 $\mu gkg^{-1}$ of coffee solids as measured in soluble coffee using the Likens method.

The present invention also relates to a method of preparing coffee with elevated levels of 3,7-dimethylocta-1,6-dien-3-ol. The method includes infusing green coffee with the vapor or liquid form of 3,7-dimethylocta-1,6-dien-3-ol diluted in a carrier of ethanol and water. The ratio of 3,7-dimethylocta-1,6-dien-3-ol to carrier should be between 5%-50%, preferably 15%, while the carrier itself should be around 60% ethanol. The composition of diluted 3,7-dimethylocta-1,6-dien-3-ol, green coffee beans and water can be 30 mg, 10 kg and 12 kg, respectively. Alternatively, the composition can also be 5000 mg (of diluted 3,7-dimethylocta-1,6-dien-3-ol), 10 kg (green coffee beans) and 12 kg (water). The preparation is left for between 15 minutes and 24 hours at a temperature of between 20° C. and 95° C.

The present invention also relates to a method of preparing coffee with elevated levels of 3,7-dimethylocta-1,6-dien-3-ol from a coffee blend having naturally low levels of 3,7-dimethylocta-1,6-dien-3-ol. The method includes taking a coffee blend having naturally low levels of 3,7-dimethylocta-1,6-dien-3-ol and adding 3,7-dimethylocta-1,6-dien-3-ol to the coffee. In one further embodiment, 3,7-dimethylocta-1,6-dien-3-ol is added to a roast and ground coffee having levels of 3,7-dimethylocta-1,6-dien-3-ol less than 4,700 $\mu gkg^{-1}$ and even as low as 30 $\mu gkg^{-1}$ as measured in the roast and ground product using the Likens method. The resulting coffee has levels of 3,7-dimethylocta-1,6-dien-3-ol greater than what would be present in this naturally low 3,7-dimethylocta-1,6-dien-3-ol coffee blend.

In various further embodiments of all of the coffee products described above having elevated levels of 3,7-dimethylocta-1,6-dien-3-ol, the final coffee product also may comprise milk, creamer, sugar and/or another sweetener.

DETAILED DESCRIPTION OF THE INVENTION

The present invention relates to coffee with elevated levels of 3,7-dimethylocta-1,6-dien-3-ol which was determined that at elevated levels, drives consumer liking for all degrees of roast within a particular geographical market. As with the traditional drivers, it is possible to identify significant segments of consumers who prefer the presence of relatively high or low levels of 3,7-dimethylocta-1,6-dien-3-ol.

The determination that 3,7-dimethylocta-1,6-dien-3-ol drove consumer liking was discovered by first taking coffee compounds and identifying their respective contributions to specific sensorial coffee attributes in order to assess the importance that each attribute contributes to consumer liking. It was determined that flavor and aroma attributes are enhanced by the addition of an associated group of coffee flavor compounds, within a robust statistical design. This method permitted the assessment of consumer reaction towards enhanced levels of each individual attribute, and did not generate unfamiliar attributes within the context of pure coffee. In this way, coffee attributes were de-coupled. Consumer responses to flavor attributes, i.e., components traditionally associated with driving coffee product liking, and others that previously had only been associated with contributing to the subtleties of the coffee product profile were determined on a component by component basis.

Through experimentation, it was surprisingly determined that a single chemical, 3,7-dimethylocta-1,6-dien-3-ol which was previously not known to be of primary importance to affect or be associated with sensory attributes, let alone, to be important at all in the overall coffee flavor, drove significant consumer liking. Further it was determined that enhanced consumer liking was attributed to 3,7-dimethylocta-1,6-dien-3-ol in a roast and ground coffee having levels of 3,7-dimethylocta-1,6-dien-3-ol of at least 6000 µgkg$^{-1}$, as measured in the roast and ground product, using the Likens method. Based on these results for levels of 3,7-dimethylocta-1,6-dien-3-ol in ground and roast coffee, one can extrapolate the data to soluble coffee having levels of 3,7-dimethylocta-1,6-dien-3-ol of at least 2000 µgkg$^{-1}$ of soluble coffee solids present in the soluble coffee.

Further, it was determined that fruity and floral attributes substantially drove consumer liking. More specifically, it was determined that fruity and floral attributes provided by 3,7-dimethylocta-1,6-dien-3-ol improves the taste of coffee products higher than achievable by varying previously known coffee attributes, components and traditional drivers. This was surprising as one would not expect a fruity and floral characteristic would enhance the overall liking of traditional, i.e., non-flavored, coffee.

The determination that a fruity and floral attribute drove consumer liking was conducted by first identifying groups of naturally occurring coffee chemicals, i.e., coffee components, each of which describe a well-known sensorial attribute of coffee. Next, the levels of these components present in a consumer tested, highly liked roast coffees were determined using the effects of three flavor groups: roasted-nutty, roasted-caramel and fruity-floral. Flavor groups representing roasted-nutty, roasted-caramel and fruity-floral notes were presented on a coffee base and the effect measured for a 100% increase of each flavor group.

A set of flavor enhanced coffee prototypes were generated to a systematic design using design of experiments software. Table 1 below shows results for two consumer groups identified by standard statistical clustering method—named here as Group A and Group B. No other large clusters are found in the test population. Group A consists of approximately 60% of the test population, Group B consists of the remaining approx. 40%. Group A and Group B scored coffee enhanced with Roasted-Nutty and Roasted-Caramel flavor compounds with no significant difference. The single differentiating reaction is in the reaction of each group to the 3,7-dimethylocta-1,6-dien-3-ol flavor compound, where Group B shows a significant "uplift" of liking score in response to the presence of 3,7-dimethylocta-1,6-dien-3-ol compared to Group A.

The result of this test are shown in Table 1 below.

TABLE 1

| | Enhancer | | |
|---|---|---|---|
| | 3,7-dimethylocta-1,6-dien-3-ol (fruity floral) | Sulphurs (Roasted-caramel) | Pyrazines (Roasted-Nutty) |
| Group A* | 4.13 | 4.24 | 4.24 |
| Group B* | 4.61 | 4.51 | 4.40 |
| Group B – Group A | +0.48 | +0.27 | +0.16 |
| Reaction** between Groups | Significant | Not significant | Not significant |

*average score over mild, medium and dark roast coffee levels
**Significant difference at 95% confidence when difference between groups is 0.42.

The numbers in Table 1 are overall liking scores evaluated based on a likeablity scale of 1-9, for groups of products with specific flavor enhancer for Group A (row 1) in which all flavor enhancers are rated parity, for groups of products with specific flavor enhancer for Group B (row 2) in which all flavor enhancers are rated parity, the difference in liking scores between Groups A and B for the same groups of products (row 3), and the significance test result from the statistical Students T-test using least-square difference (LSD) measure when comparing mean scores from the consumer groups (row 4).

Results identify 3,7-dimethylocta-1,6-dien-3-ol enhancer as driving overall liking responses between these two groups. For Group B (40%), 3,7-dimethylocta-1,6-dien-3-ol is a positive driver.

An analysis of consumer liking scores showed a surprisingly natural clustering of results. Modifications of the levels of compounds responsible for roasted-nutty and roasted-caramel notes did not produce a significant response in liking scores, despite the previously widely accepted view that these are highly sought attributes by both consumers and experts alike. However, an increase of the fruity-floral group did result in a significant increase in consumer liking, despite these flavors being previously considered unimportant in consumer liking.

More surprisingly, the fruity-floral flavor group compound—3,7-dimethylocta-1,6-dien-3-ol, which was previously considered unimportant in its contribution to the overall coffee flavor, drove customer taste preference. In sum, it was determined that fruity-floral flavor character of coffee is a "driver" of liking for 40% of consumers (Group B, the likers) and is not an "alienator" for the remaining 60% (Group A, the acceptors). Based on statistics, a reaction is significant when scores differ by more than 0.5 on 9.0 point scale.

A complimentary consumer test showed a similar response, even when 3,7-dimethylocta-1,6-dien-3-ol was present at approximately 1000 times the highest levels found in standard brewed coffees as measured in the brewed coffee solids. Surprisingly, the addition of 3,7-dimethylocta-1,6-dien-3-ol provided the ability to highly enhance coffee without producing unbalanced and non-coffee-like notes.

Referring now to the Tables 2 and 3, a group of consumers identified as reacting favorably to the presence of 3,7-dimethylocta-1,6-dien-3-ol performed a taste test on further enhanced coffee products having different elevated levels of 3,7-dimethylocta-1,6-dien-3-ol from coffee having naturally occurring levels of 3,7-dimethylocta-1,6-dien-3-ol. As shown by Samples A, B and C, the group positively identified enhanced coffee flavor for all three samples having added 3,7-dimethylocta-1,6-dien-3-ol in a spray dried form in roast and ground coffee (Table 2). The spray dried 3,7-dimethylocta-1,6-dien-3-ol resulted in elevated levels of 3,7-dimethylocta-1,6-dien-3-ol.

TABLE 2

Enhanced Roast and Ground Coffee

| Product | | Level of 3,7-dimethylocta-1,6-dien-3-ol in roast and ground coffee ($\mu g kg^{-1}$) | Amount of 3,7-dimethylocta-1,6-dien-3-ol extracted into final beverage per kg of roast and ground used to prepare the brew ($\mu g kg^{-1}$) | Sensorial difference vs. Reference coffee.* |
|---|---|---|---|---|
| Reference "well-liked" roast and ground coffee | | 624 | 180 | — |
| Sidamo Grade 2 roast and ground coffee | | 4666 | 422 | — |
| Enhanced dry roast and ground coffee** | Sample A | 6,000 | 1100 (estimated) | Yes |
| | Sample B | 8,000 | 1460 (estimated) | Yes |
| | Sample C | 60,422 | 11,405 | Yes |

*At a statistically significant level.
**Samples A, B and C enhanced by mixing spray dried 3,7-dimethylocta-1,6-dien-3-ol into the reference roast and ground coffee. All beverages prepared for consumption using a drip filter machine and a ratio of 49 g of roast coffee to 1 L water.

From Table 2, it is obvious that not all of the 3,7-dimethylocta-1,6-dien-3-ol in the roast and ground product is extracted into the final beverage, even when using a drip filter preparation method as employed in this taste test. The extraction of 3,7-dimethylocta-1,6-dien-3-ol from the enhanced roast and ground coffee is in the region of 18%. It is clear that when adding 3,7-dimethylocta-1,6-dien-3-ol directly to the pre-prepared coffee extract one must be careful to make an adjustment for this factor to avoid ending up with a beverage that has a higher level of 3,7-dimethylocta-1,6-dien-3-ol than expected, irrespective of whether the 3,7-dimethylocta-1,6-dien-3-ol is added to the prepared coffee as a liquid or encapsulated or any other form. In this way, a second taste test was performed where liquid 3,7-dimethylocta-1,6-dien-3-ol was added at suitable levels to coffee extract pre-prepared via a drip filter method, taking into account that it was necessary to add only around 18% of the 3,7-dimethylocta-1,6-dien-3-ol to the brewed coffee compared to the amount of 3,7-dimethylocta-1,6-dien-3-ol added to the roast and ground coffee, resulting in a final beverage with comparable levels of 3,7-dimethylocta-1,6-dien-3-ol. The levels of this second taste test are shown in Table 3.

TABLE 3

Enhanced Brewed Roast Coffee

| Product | | Amount of 3,7-dimethylocta-1,6-dien-3-ol in the final beverage per kg of the roast and ground coffee used to prepare the brew. ($\mu g kg^{-1}$) | Sensorial difference vs. Reference coffee.* |
|---|---|---|---|
| Reference "well-liked" roast and ground coffee | | 180 | — |
| Sidamo Grade 2 roast and ground coffee | | 422 | — |
| Enhanced brewed roast and ground coffee** | Sample D | 600 | No |
| | Sample E | 1000 | Yes |
| | Sample F | 1200 | Yes |
| | Sample G | 6000 | Yes |

*At a statistically significant level.
**Samples D, E, F and G prepared by adding liquid 3,7-dimethylocta-1,6-dien-3-ol to a pre-extracted roast coffee beverage produced from the "well-liked" reference coffee. The pre-extracted roast and ground beverage is prepared using a drip filter machine and a ratio of 49 g of roast coffee to 1 L water.

dimethylocta-1,6-dien-3-ol to a pre-extracted roast coffee beverage produced from the "well-liked" reference coffee. The pre-extracted roast and ground beverage is prepared using a drip filter machine and a ratio of 49 g of roast coffee to 1 L water.

TABLE 4

Soluble Coffee

| Product | | 3,7-dimethylocta-1,6-dien-3-ol per kg of soluble coffee ($\mu g kg^{-1}$) | Sensorial difference vs. Reference coffee.* |
|---|---|---|---|
| Reference "well liked" soluble coffee | | 300 | — |
| Enhanced soluble coffee | Sample H | 2000 | Yes |
| | Sample I | 3000 | Yes |
| | Sample J | 4000 | Yes |

Referring now to Table 4, the group was able to discern elevated levels of 3,7-dimethylocta-1,6-dien-3-ol in a soluble coffee product. The group was able to discern the enhanced soluble coffee from the reference soluble coffee even where quantities are increased to as low as 2000 μg of 3,7-dimethylocta-1,6-dien-3-ol per kg of soluble coffee, as shown by Sample H which has added liquid 3,7-dimethylocta-1,6-dien-3-ol added to a soluble coffee powder/granules. Soluble coffee product includes concentrated soluble solids of coffee such as spray dried, freeze dried, agglomerated and liquid concentrates, and coffee extract, to name a few.

Elevated levels of 3,7-dimethylocta-1,6-dien-3-ol in coffee can be achieved by multiple routes. In one preferred embodiment, encapsulated 3,7-dimethylocta-1,6-dien-3-ol is incorporated in an encapsulated form directly into roast and ground coffee. The roast and ground coffee may consist of any blend of green coffee beans that have been prepared using any selected roasting condition. The final coffee beverage is prepared by the customer's brew method of choice. Examples of some brew methods include but are not limited to, automatic drip filter, manual drip filter, percolator, espresso and French press.

Alternatively, encapsulated 3,7-dimethylocta-1,6-dien-3-ol itself may be prepared by any technology that traps the coffee compound in a solid or glassy matrix until it is contacted by water in the brewing process. Suitable encapsulation methods include, but are not limited to, spray drying and freeze drying. In one preferred embodiment, 3,7-dimethylocta-1,6-dien-3-ol is spray dried to a formula consisting of: maltodextrin (80% to 99.80%), gum arabic (0% to 19.8%), tricalcium phosphate (1%) and 3,7-dimethylocta-1,6-dien-3-ol (0.2%). 3,7-dimethylocta-1,6-dien-3-ol can be incorporated into the roast and ground coffee at between 1% and 15% of the total finished product weight.

In further additional embodiments, 3,7-dimethylocta-1,6-dien-3-ol is encapsulated at higher or lower percentages in the matrix, and the percentage of encapsulated 3,7-dimethylocta-1,6-dien-3-ol that is incorporated into the roast and ground coffee is varied as necessary to achieve the desired coffee product.

Advantageously, the level of 3,7-dimethylocta-1,6-dien-3-ol should be present in a level of at least 6000 $\mu g k g^{-1}$, as measured in the roast and ground product using the Likens method. The 3,7-dimethylocta-1,6-dien-3-ol can be in the form of encapsulated 3,7-dimethylocta-1,6-dien-3-ol-containing matrix consisting of the following components: maltodextrin (80%-99.97%), gum arabic (0%-19.97%), tricalcium phosphate (0%-1%) and 3,7-dimethylocta-1,6-dien-3-ol (0.02%-20%). The encapsulated 3,7-dimethylocta-1,6-dien-3-ol is then mixed into the roast and ground coffee at between 1% and 15% of the total final product weight. In addition, it is advantageous to have 3,7-dimethylocta-1,6-dien-3-ol present in a soluble coffee in at least 2000 $\mu g k g^{-1}$ of soluble coffee solids where encapsulated 3,7-dimethylocta-1,6-dien-3-ol is mixed with or added to soluble coffee in the amount of 1% and 15% of final product weight.

In another embodiment, roast whole coffee beans or roast and ground coffee are infused by vapor or liquid forms of the flavor component, 3,7-dimethylocta-1,6-dien-3-ol. The resulting infused roast coffee beans or roast and ground coffee, were determined to have levels of 3,7-dimethylocta-1,6-dien-3-ol in excess of 6000 $\mu g k g^{-1}$, as measured in the roast and ground product using the Likens measurement method.

Infusion of green coffee is achieved by the infusion of vapor or liquid forms of the flavor component, 3,7-dimethylocta-1,6-dien-3-ol. For example, a batch of green coffee beans can be placed in a vessel (with or without heating capability), with water and a solution composed of 3,7-dimethylocta-1,6-dien-3-ol diluted into a carrier of ethanol and water. The ratio of 3,7-dimethylocta-1,6-dien-3-ol to carrier can be between 5%-50%, preferably 15%, while the carrier itself is 60% ethanol. The composition of diluted 3,7-dimethylocta-1,6-dien-3-ol (aforementioned solution), green beans and water can be 30 mg, 10 kg and 12 kg, respectively. The composition can also be 5000 mg (of diluted 3,7-dimethylocta-1,6-dien-3-ol), 10 kg (green coffee beans) and 12 kg (water). The preparation is left for between 15 minutes and 24 hours at a temperature of between 20° C. and 95° C. Before roasting, the coffee beans are drained and dried in an air stream. The coffee, following roasting, cooling and grinding stages, has levels of 3,7-dimethylocta-1,6-dien-3-ol of at least 6000 µgkg–1, as measured in the roast and ground product using the Likens measurement method.

In another embodiment, coffee beans are encrusted or coated with spray dried, or otherwise encapsulated, 3,7-dimethylocta-1,6-dien-3-ol. The encrusting matrix of encapsulated 3,7-dimethylocta-1,6-dien-3-ol are present at a level that resulted in the final ground product containing levels of 3,7-dimethylocta-1,6-dien-3-ol of at least 6000 $\mu g k g^{-1}$, as measured in the roast and ground product using the Likens method.

In another embodiment, 3,7-dimethylocta-1,6-dien-3-ol is introduced into either the roasting or quenching chamber as a vapor, liquid or spray dried form. The coffee, following roasting, cooling and grinding stages, has levels of 3,7-dimethylocta-1,6-dien-3-ol of at least 6000 $\mu g k g^{-1}$, as measured in the roast and ground product using the Likens measurement method.

In yet another embodiment, 3,7-dimethylocta-1,6-dien-3-ol (vapor, liquid or encapsulated) is introduced into roast whole coffee beans, roast and ground coffee powder, soluble powder, soluble granules, concentrated liquid coffee extract, ready to drink coffee extract, concentrated liquid coffee extract mix or ready to drink coffee extract mix. The 3,7-dimethylocta-1,6-dien-3-ol can be dissolved in an appropriate oil base or carrier.

In a further embodiment, 3,7-dimethylocta-1,6-dien-3-ol is added to a coffee blend which has naturally present low levels of 3,7-dimethylocta-1,6-dien-3-ol. The advantage of adding 3,7-dimethylocta-1,6-dien-3-ol to coffee having naturally low levels is that one can take a coffee blend with low levels of 3,7-dimethylocta-1,6-dien-3-ol and enhance its flavor by increasing the levels of 3,7-dimethylocta-1,6-dien-3-ol to levels found in blends having naturally higher levels of 3,7-dimethylocta-1,6-dien-3-ol.

For example, 3,7-dimethylocta-1,6-dien-3-ol can be added to a roast and ground coffee having levels of 3,7-dimethylocta-1,6-dien-3-ol less than 4,700 $\mu g k g^{-1}$ and even as low as 30 $\mu g k g^{-1}$. The resulting coffee will have levels of 3,7-dimethylocta-1,6-dien-3-ol greater than what would be present in this naturally low 3,7-dimethylocta-1,6-dien-3-ol coffee blend.

One of ordinary skill in the art will readily appreciate that any of various present coffee products having elevated levels of 3,7-dimethylocta-1,6-dien-3-ol, can be combined with milk, creamer, sugar and/or another sweetener to form a final coffee product.

Although the invention has been described in detail with respect to the preferred embodiments thereof, it will be apparent to one of ordinary skilled in the art that the invention is capable of numerous modifications and variations within the scope and spirit of the invention.

The invention claimed is:

1. A coffee composition, comprising roast and ground coffee having levels of 3,7-dimethylocta-1,6-dien-3-ol of at least 6000 $\mu g k g^{-1}$ of dried roast and ground coffee as measured in the roast and ground product using the measurement method of Likens.

2. The coffee composition of claim 1, wherein the levels of 3,7-dimethylocta-1,6-dien-3-ol in dry roast and ground coffee is at least 8000 $\mu gkg^{-1}$ as measured using the Likens method.

3. The coffee composition of claim 1, wherein the levels of 3,7-dimethylocta-1,6-dien-3-ol in dry roast and ground coffee is at least 16,000 $\mu gkg^{-1}$ as measured using the Likens method.

4. A method for manufacturing a coffee flavored beverage having enhanced in cup coffee brew flavor, said method comprising adding 3,7-dimethylocta-1,6-dien-3-ol to a roast and either whole bean or ground coffee to increase the concentration of 3,7-dimethylocta-1,6-dien-3-ol to at least 6000 $\mu gkg^{-1}$ of the whole bean or ground coffee as measured in the whole or ground coffee using the measurement method of Likens.

5. The method of claim 4, wherein said adding 3,7-dimethylocta-1,6-dien-3-ol comprises adding 3,7-dimethylocta-1,6-dien-3-ol to increase the concentration of 3,7-dimethylocta-1,6-dien-3-ol to at least 8000 $\mu gkg^{-1}$ of the whole or ground coffee as measured in the whole or ground coffee using the measurement method of Likens.

6. The method of claim 4, wherein said adding 3,7-dimethylocta-1,6-dien-3-ol comprises adding 3,7-dimethylocta-1,6-dien-3-ol to increase the concentration of 3,7-dimethylocta-1,6-dien-3-ol to at least 10,000 $\mu gkg^{-1}$ of the whole or ground coffee as measured in the whole or ground coffee using the measurement method of Likens.

7. The method of claim 4, wherein said adding 3,7-dimethylocta-1,6-dien-3-ol comprises adding 3,7-dimethylocta-1,6-dien-3-ol to increase the concentration of 3,7-dimethylocta-1,6-dien-3-ol to at least 16,000 $\mu gkg^{-1}$ of whole or ground coffee as measured in the whole or ground coffee using the measurement method of Likens.

\* \* \* \* \*

UNITED STATES PATENT AND TRADEMARK OFFICE
CERTIFICATE OF CORRECTION

| | | |
|---|---|---|
| PATENT NO. | : 7,892,587 B2 | Page 1 of 1 |
| APPLICATION NO. | : 10/562394 | |
| DATED | : February 22, 2011 | |
| INVENTOR(S) | : Norton et al. | |

It is certified that error appears in the above-identified patent and that said Letters Patent is hereby corrected as shown below:

In column 4, line 36, please change "20°C." to --20°C--

In column 10, line 5, please change "20°C." to --20°C--

In column 7, lines 26-29, please delete "dimethylocta-1,6-dien-3-ol into the reference roast and ground coffee. All beverages prepared for consumption using a drip filter machine and a ratio of 49 g of roast coffee to 1L water."

In column 8, lines 43-47, please delete "dimethylocta-1,6-dien-3-ol to a pre-extracted roast coffee beverage produced from the "well-liked" reference coffee. The pre-extracted roast and ground beverage is prepared using a drip filter machine and a ratio of 49 g of roast coffee to 1L water."

Signed and Sealed this
Seventeenth Day of May, 2011

David J. Kappos
*Director of the United States Patent and Trademark Office*